US008881005B2

(12) United States Patent
Al Badrashiny et al.

(10) Patent No.: US 8,881,005 B2
(45) Date of Patent: Nov. 4, 2014

(54) METHODS AND SYSTEMS FOR LARGE-SCALE STATISTICAL MISSPELLING CORRECTION

(75) Inventors: Mohammed A. Al Badrashiny, Riyadh (SA); Mansour M. Alghamdi, Riyadh (SA); Mohamed I. Alkanhal, Riyadh (SA); Abdulaziz O. Al-Qabbany, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 239 days.

(21) Appl. No.: 13/451,763

(22) Filed: Apr. 20, 2012

(65) Prior Publication Data

US 2013/0283156 A1 Oct. 24, 2013

(51) Int. Cl.
*G06F 17/00* (2006.01)

(52) U.S. Cl.
USPC .......................................................... 715/257

(58) Field of Classification Search
CPC ...................................................... G06F 17/273
USPC ........................................................... 715/257
See application file for complete search history.

(56) References Cited

U.S. PATENT DOCUMENTS

| | | | | |
|---|---|---|---|---|
| 5,576,955 | A * | 11/1996 | Newbold et al. | 715/217 |
| 6,131,102 | A * | 10/2000 | Potter | 715/257 |
| 7,076,731 | B2 * | 7/2006 | Brill et al. | 715/257 |
| 7,117,144 | B2 * | 10/2006 | Goodman et al. | 704/9 |
| 7,516,404 | B1 * | 4/2009 | Colby | 715/257 |
| 7,599,828 | B2 * | 10/2009 | Fontenelle et al. | 704/1 |
| 7,827,484 | B2 * | 11/2010 | Dejean et al. | 715/256 |
| 8,201,086 | B2 * | 6/2012 | Kritt et al. | 715/257 |
| 8,225,203 | B2 * | 7/2012 | Unruh | 715/255 |
| 8,401,314 | B2 * | 3/2013 | Qiu et al. | 382/229 |
| 8,594,999 | B2 * | 11/2013 | Hsu | 704/9 |
| 8,600,802 | B1 * | 12/2013 | Tveit et al. | 705/14.1 |
| 8,661,049 | B2 * | 2/2014 | Will et al. | 707/759 |
| 2002/0087408 | A1 * | 7/2002 | Burnett | 705/14 |
| 2003/0033288 | A1 * | 2/2003 | Shanahan et al. | 707/3 |
| 2006/0167676 | A1 * | 7/2006 | Plumb | 704/6 |
| 2007/0016616 | A1 * | 1/2007 | Brill et al. | 707/104.1 |
| 2009/0172523 | A1 * | 7/2009 | Colby | 715/257 |
| 2011/0184723 | A1 * | 7/2011 | Huang et al. | 704/8 |
| 2012/0229388 | A1 * | 9/2012 | Oh et al. | 345/169 |
| 2013/0205204 | A1 * | 8/2013 | Qiu et al. | 715/257 |
| 2014/0013205 | A1 * | 1/2014 | Mikhaiel et al. | 715/234 |

OTHER PUBLICATIONS

Church et al., Probability Scoring for Spelling Correction, Statistics and Computing 1991, pp. 91-103.*
Heymann et al., Unsupervised Word Segmentation from Noisy Input, IEEE 2013, pp. 458-463.*

(Continued)

*Primary Examiner* — Cong-Lac Huynh
(74) *Attorney, Agent, or Firm* — Andrew M. Calderon; Roberts Mlotkowski Safran & Cole, P.C.

(57) ABSTRACT

Methods and systems for large-scale statistical misspelling correction are provided. A method implemented in a computer infrastructure includes reviewing the input text to detect spelling errors in one or more words and calculating a variable cost distance of letters associated with the one or more words. Furthermore, the method can detect space-deletion errors and space-insertion errors. The method further includes determining a best candidate solution for correcting the spelling errors based on the variable cost distance. The method includes correcting the spelling errors using the best candidate solution.

19 Claims, 7 Drawing Sheets

(56) References Cited

OTHER PUBLICATIONS

Zribi, et al., "Combining Methods for Detecting and Correcting Semantic Hidden Errors in Arabic Texts", Proceedings of the 8th Int. Conference . . . , pp. 634-345, 2007.
Shaalan, et al., "An Approach for Analyzing and Correcting Spelling Errors for Non-native Arabic learners", 7th Int. Conference on Informatics and Systems, 7 pages, 2010.
Deorowicz, et al., "Correcting Spelling Errors by Modelling Their Causes", Int. Journal of Applied Mathematics and Computer Science, vol. 15, No. 2, pp. 275-285, 2005.
Carlson, et al., "Memory-Based Context-Sensitive Spelling Correction at Web Scale", ICMLA, pp. 166-171, 2007.
Kukich, Karen "Techniques for Automatically Correcting Words in Text" ACM Computing Surveys Journal, vol. 24, Issue 4, pp. 377-439, 1992.
Bethard, et al., Instructor's Solution Manual Speech and Language Processing, An Introduction to Natural Language Processing . . . Speech Recognition, 116 p., Prentice Hall, 2009.
Damerau, Fred J., "A Technique for Computer Detection and Correction of Spelling Errors", Commun. ACM, vol. 7, No. 3, pp. 171-176, 1964.
Toutanova, et al., "Pronunciation Modeling for Improved Spelling Correction", in Proceedings of the 40th Annual Meeting of the Association . . . Linguistics, pp. 144-151, 2002.
Reynaert, "Character confusion versus focus word-based correction of spelling and OCR . . . ", Int. Journal on Document Analysis and Recognition, vol. 14, pp. 173-187, 2011.
Brill, et al., "An Improved Error Model for Noisy Channel Spelling Correction", Proceedings of the 38th Annual Meeting on ACL, pp. 286-293, 2000.
Fossati, et al., "A Mixed Trigrams Approach for Context Sensitive Spell Checking", Proceedings of the 8th Annual Meeting on ACL, 11 pages, 2007.
Dalkilic, et al., "Turkish Spelling Error Detection and Correction by Using Word N-gams", Proceedings of the 5th International conference . . . , 4 pages, 2009.
Islam, et al., "Real-Word Spelling Correction using Google Web 1T n-gram with Backoff", Proceedings of the IEEE Int'l Conference on Natural Language Processing, 8 pages, 2009.
Shaalan, et al., "Towards Automatic Spell Checking for Arabic", Proceedings of the 4th Conference on Language Engineering, pp. 240-247, 2003.
Rachidi, et al., "Arabic User Search Query Correction and Expansion", in Proceedings of the 1st Plenary Information technology Pole . . . , 4 pages, 2003.
Hassan, et al., "Language Independent Text Correction using Finite State Automata", in Proceedings of the 2008 Int'l Joint Conf. on Natural Language Processing, pp. 913-918.
Rytting, et al., "Spelling Correction for Dialectal Arabic Dictionary Lookup", ACM transactions on Asian Language Information Processing 10(1), 15 pages, 2011.
Schierle, et al., "From Spelling Correction to Text Cleaning - Using Context Information", Studies in Classification, Data Analysis, and . . . Organization, pp. 397-404, 2008.
Kolak, et al., "A generative Probabilistic OCR Model for NLP Applications", Proceedings of the Conference . . . , pp. 55-62, 2003.
Delden, et al., "Supervised and Unsupervised Automatic Spelling Correction Algorithms", Proceedings of the IEEE Int'l Conf. on .. Integration, pp. 530-535, 2004.
Xie, et al, "Error Analysis and the EFL classorom teaching", US-China Education Review, vol. 4, No. 9, pp. 10-14, 2007.
Nadeau, et al., "A survey of named entity recognition and classification", Lingvisticae Investigationes, vol. 30, Issue 1, pp. 3-26, 2007.
Benajiba, et al., "Arabic Named Entity Recognition: A Feature-Driven Study", IEEE Transactions on Audio, Speech and Language Processing, vol. 17, Issue 5, pp. 926-934, 2009.
Shaalan, et al., "NERA: Named Entity Recognition for Arabic", Journal of the American Society for Information Science and Technology, vol. 60, Issue 8, pp. 1652-1663, 2009.
Nilsson, Nils J., "Problem-Solving Methods in Artificial Intelligence", McGraw-Hill, 270 pp., 1971.
Levenshtein, V.I., "Binary codes capable of correcting deletions, insertions, and reversals", Soviet Physics Doklady, vol. 10, No. 8, pp. 707-710, 1966.
Shaalan, Khaled F., "An Intelligent Computer Assisted Language Learning System for Arabic Learners", Computer Assisted language Learing, vol. 18, No. 1-2, pp. 81-108, 2005.
Navarro, Gonzalo, "A Guided Tour to Approximate String Matching", ACM Computing Surveys, vol. 33(1), pp. 31-88, 2001.
Katz, Slava M. "Estimation of Probabilities from Sparse Data for the Language Model Component of a Speech Recognizer", IEEE Transactions on .., vol. ASSp-35, pp. 400-401, 1987.
Manning, et al., "Foundations of Statistical Natural Language Processing", The MIT Press, 704 pages, 2000.
Stolcke, Andreas, "SRILM—An Extensible Language Modeling Toolkit", Proceedings on the International Conference on Spoken Language Processing (ICSLP), pp. 901-904, 2002.
Attia, Mohamed, "Theory and Implementation of a large-Scale Arabic Phonetic Transcriptor, and Applications", Dept. of Electronics and Electrical Comm., 116 pages, 2005.
Attia, et al., "On Stochastic Models, Statistical Disambiguation, and Applications on Arabic NLP Problems", Proceedings of the 3rd Conf. on Language Eng., 15 pages, 2002.
Rashwan, et al. "A Stochastic Arabic Diacritizer Based on a Hybrid of Factorized and Unfactorized Textual Features", IEEE Transactions . . . , vol. 19, No. 1, pp. 166-175, 2011.

\* cited by examiner

METHODS AND SYSTEMS FOR LARGE-SCALE STATISTICAL MISSPELLING CORRECTION

FIELD OF THE INVENTION

The invention relates to textual processing and, more particularly, to methods and systems for large-scale statistical misspelling correction.

BACKGROUND OF THE INVENTION

Text enhancement systems are used in the area of human language technology (HLT) where manual correction of text is time consuming and creates a bottleneck in HLT applications. Systems in HLT, e.g., document understanding systems and speech recognition systems, depend on reliable automatic misspelling correction capabilities. Although spell checkers are widely available for a number of languages, most spell checkers only detect errors and propose corrections regardless of their context, which increases ambiguity and incorrect suggestions for misspelled words. Also, the available systems are not able to detect and correct all kinds of errors, in addition to having other constraints.

An automatic misspelling correction process includes three main components: (i) error detection process; (ii) candidates generating process; and (iii) best candidate selection process. The most common types of errors can be separated in the following categories based on a detection and correction difficulty:

(i) $1^{st}$ order errors which include correctly spelled words that have one or more insertions, deletions, substitutions, or transpositions, which results in a non-word (i.e. words that do not follow target language morphological rules, and are not included in a dictionary of the target language), e.g., the Arabic word "يكتبها—Yaktoboha" which means "He writes it" becomes the non-word "يتبتا—Yatobota" after the deletion and substitution of some letters;

(ii) $2^{nd}$ order errors which include correctly spelled words that have one or more spaces insertions or deletions, which results in non-word(s), e.g., the Arabic phrase "بريق الذهب—Bareeq Althahab" which means "The glitter gold" becomes the non-word "بريقالذهب—Bareeqalthahab" after the space deletion;

(iii) $3^{rd}$ order errors which are similar to the $1^{st}$ order errors except that the error(s) results in another correctly spelled word, e.g., the Arabic word "يشرب—Yashrab" which means "He drinks" becomes the correctly spelled word "بشرب—Bishurb" which means "By drinking";

(iv) $4^{th}$ order errors which are similar to the $2^{nd}$ order errors except that the error(s) results in correctly spelled words, e.g., the Arabic word "متطور—Mutatawir" which means "Advanced" becomes the correctly spelled phrase "مت طور—Mot Tawar" which means "Die Developed".

(v) $5^{th}$ order errors which are $1^{st}$ order errors followed by space insertions or space deletions which results in other non-word(s), e.g., the original Arabic word "يكتبها—Yaktoboha" which means "He writes it" becomes the non-word "يتبتا—Yatobota" by a $1^{st}$ order error, then it becomes "يت بتا—Yato Bota" by space insertion; and (vi) $6^{th}$ order errors which are $1^{st}$ order errors followed by space insertions or space deletions which results in other correctly spelled word(s), e.g., the original Arabic word "يكتبها—Yaktoboha" which means "He writes it" becomes the non-word "سكتبها—Saktoboha" by a $1^{st}$ order error, then it becomes "سكت بها—Sakata Beha" which means "Stopped-talking With-it" by space insertion.

Two common methods for error detection are a rule based method and a dictionary based method. The rule based method depends on morphological analyzers to check whether the word is following language morphological rules or not. The dictionary based method depends on a large, balanced and revised training corpus to generate a dictionary which covers the most frequently used words in the target language. The rule based method has better coverage of possible words, but the morphological analyses process adversely affects system performance and cannot manage transliterated words. For example, the word "computer" is an English word and it is a common word now in Arabic as "كمبيوتر"; however, "كمبيوتر" is a non-word from the point of view of Arabic morphological analyzers. To the contrary, the dictionary based method considers the word "computer" in Arabic as a correctly spelled word since it is a frequently used word in the training corpus.

The $3^{rd}$, $4^{th}$, and $6^{th}$ order errors are also known as semantic hidden errors because they are correctly spelled words but cause semantic irregularities in their contexts. The error detection process is responsible for detecting the misspelled words, whether they are non-words or semantic hidden words. The error detection process of the semantic hidden errors is more difficult than the non-words error detection process.

Techniques used to detect the semantic hidden errors include semantic distance, confusion set, and neural network. The semantic distance technique is based on comparing a word semantic with surrounding words. However, this approach faces other HLT challenges, such as, word sense disambiguation. In the confusion set technique, the confusion set includes a dictionary of words that occur together, but requires a large dictionary size which produces computational complexity. The neural network technique detects the non-words, but faces challenges, such as, detecting space insertions and deletions.

The candidates generating process is responsible for finding the most probable candidates for the misspelled words. An edit distance method is a commonly used method for this process. The best candidate selection process is responsible for determining and selecting one or more solutions to correct the misspelled word(s). Most systems stop at the candidates generating process and do not include a best candidate selection process. However, the systems that do attempt to provide solutions have constraints and rely on assumptions to perform automatic misspelling detection and correction.

Accordingly, there exists a need in the art to overcome the deficiencies and limitations described hereinabove.

SUMMARY OF THE INVENTION

In a first aspect of the invention, a method implemented in a computer infrastructure comprises reviewing an input text to detect spelling errors in one or more words by detecting space-deletion errors and space-insertion errors, and calculating a variable cost distance of letters associated with the one or more words. The method further comprises determining a best candidate solution for correcting the spelling errors based on the variable cost distance. The method also comprises correcting the spelling errors using the best candidate solution.

In another aspect of the invention, a tangible computer usable storage medium having readable program code embodied in the tangible computer usable storage medium is provided. The computer program product includes at least one component operable to review an input text to detect spelling errors in one or more words and calculate a variable Damerau-Levenshtein cost distance of letters associated with the one or more words. The at least one component is further operable to determine a best candidate solution for correcting the spelling errors based on the variable Damerau-Levenshtein cost distance using an A* lattice search and an m-grams probability estimation. The at least one component is further operable to correct the spelling errors using the best candidate solution.

In yet another aspect of the invention, a computer system for tokenizing multilingual textual documents comprises a CPU, a computer readable memory and a tangible computer readable storage media. The computer system further comprises first program instructions to review an input text to detect spelling errors in one or more words. The computer system further includes second program instruction to calculate a variable cost distance of letters associated with the one or more words and third program instructions to determine a best candidate solution for correcting the spelling errors based on the variable cost distance using an A* lattice search and an m-grams probability estimation. The computer system also includes fourth program instructions to correct the spelling errors using the best candidate solution. The first, second, third, and fourth program instructions are stored on the tangible computer readable storage media for execution by the CPU via the computer readable memory. The calculating the variable cost distance comprises utilizing a Damerau-Levenshtein distance to determine a cost of correcting the detected spelling errors, wherein letters having similar shapes, similar pronunciation, or keyboard proximity are given a low variable cost distance. The determining the best candidate solution comprises comparing the spelling errors with all words in a dictionary using the variable cost distance and selecting one or more words having a minimum variable cost distance.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
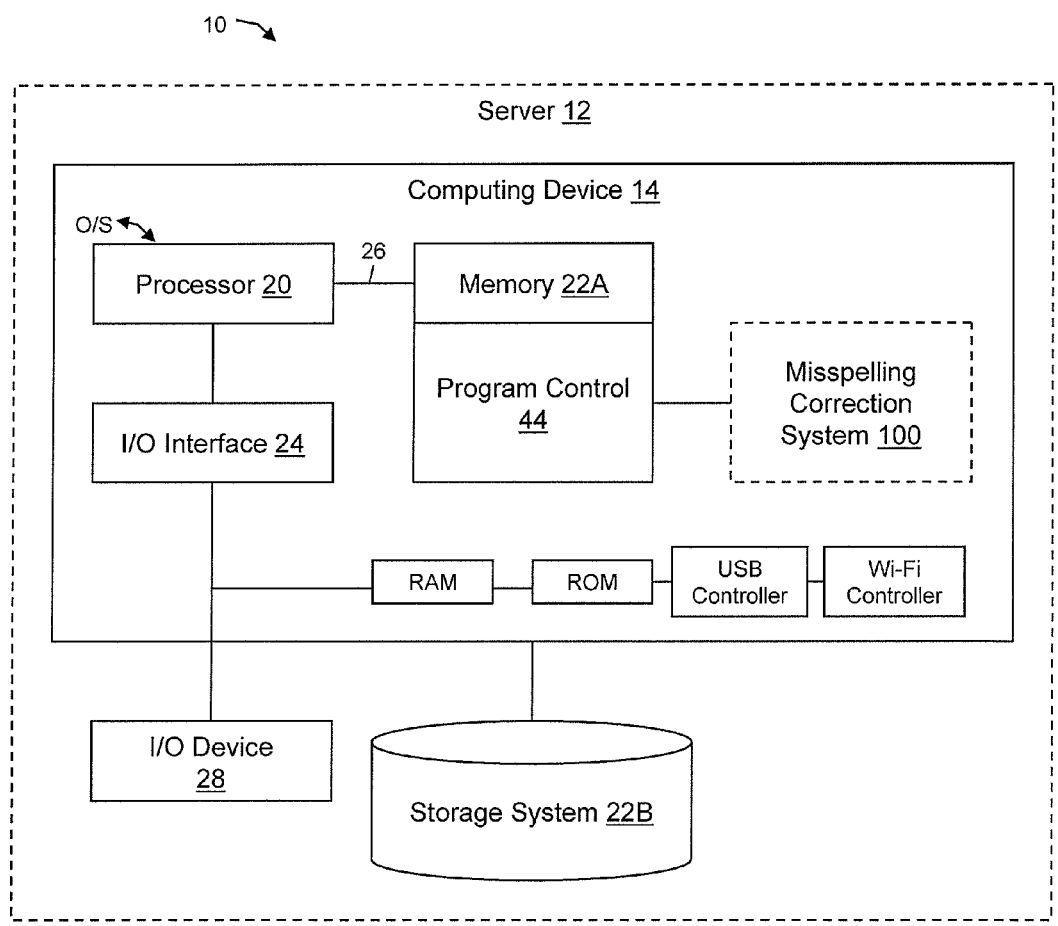
FIG. 1 shows an illustrative environment for implementing steps in accordance with aspects of the present invention.

The invention relates to textual processing and, more particularly, to methods and systems for large-scale statistical misspelling correction. The system for large-scale statistical misspelling correction includes an offline phase and a runtime phase. In the offline phase, training text is provided to a dictionary builder and a language model builder to create a dictionary and a language model, respectively. In the runtime phase, an input text and the dictionary are provided to a candidate generating module, which uses the dictionary to detect any errors in the input text and generate candidates for correcting the errors. The generated candidates are provided to a candidate lattice, which is disambiguated in a word disambiguator, which uses the language model to determine a preferred solution to the error(s). The word disambiguator then outputs correctly spelled words.

According to aspects of the present invention, the system for large-scale statistical misspelling correction advantageously provides for increased flexibility. More specifically, the system and method is language independent because it is fully statistical, and as such, can be applied on any language with very few changes. Additionally, the system and method provides for increased performance because it is fully statistical without any rule based component. Also, advantageously, the system and method can be utilized on Arabic, and is a fully automatic system that can work on a very huge size of documents with any number of spelling mistakes. The system and method also provides for increased recall and precision rates for both the detection and correction of misspelled words.

According to aspects of the present invention, the system for large-scale statistical misspelling correction finds and automatically corrects any word that either contains misspelled letters, deleted letters, or extra letters, e.g., ذهب الولج إلى المدرة (a non-word with no translation) is corrected to ذهب الولد إلى المدرسة (the boy went to the school). The system for large-scale statistical misspelling correction also finds and automatically corrects merged words, e.g., هبالولدإلىالمدرسة (theboywenttotheschool) is corrected to ذهب الولد إلى المدرسة (the boy went to the school). The system for large-scale statistical misspelling correction also advantageously finds and automatically corrects split words, e.g., ذهب الولد إلى المدر سة (the boy went to the school) is corrected to ذهب الولد إلى المدرسة (the boy went to the school). The system for large-scale statistical misspelling correction finds and automatically corrects correctly spelled words with a wrong meaning in a given context, e.g., عندي مال كبير جداً (I have too big money) is a correctly spelling word, but is not suitable to use in a given context, thus it is corrected to عندي مال كثير جدا (I have too much money).

SYSTEM ENVIRONMENT

The present invention may be embodied as a system, method or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

FIG. 1 shows an illustrative environment 10 for managing the processes in accordance with aspects of the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device 14 includes random access memory (RAM) to store temporary results, a read-only memory (ROM) to store system settings, and an operating system (O/S). The computing device 14 also includes a USB controller to communicate through a USB port and a Wi-Fi controller to control wireless communications between the computing device 14 and wireless networks.

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, determining single-word errors, space-deletion errors, and space-insertion errors, which can be implemented by the misspelling correction system 100. The misspelling correction system 100 can be implemented as a dedicated processor or multiple dedicated processors.

In embodiments, the misspelling correction system 100 automatically detects and corrects errors in a document based on a context-based, two-layer stochastic system. In embodiments, the first layer of the stochastic system ranks possible alternatives for each misspelled word using a Damerau-Levenshtein edit distance, and the second layer selects a best solution by choosing the sequence of letters with a maximum marginal probability via an A* lattice search and an m-gram probability estimation. For example, when the misspelled word is two or more words merged together, the error is corrected by separating the merged word into two or more correctly spelled words.

In embodiments, the misspelling correction system 100 is based on a dictionary lookup technique. In this way, the misspelling correction system 100 handles the most commonly used words. Additionally, the misspelling correction system 100 can be adapted according to needs, e.g., the dictionary is customized according to user requirements by adding new user defined words. For example, in embodiments, a training corpus for the dictionary represents the most commonly used words in a target language including name-entities. In embodiments, the words in the dictionary are arranged in ascending alphabetical order for faster comparison using a binary search method. In this way, words starting with a same letter are placed in a separate table, which improves system performance. For example, in embodiments, the dictionary is based on an Arabic training corpus with a size of 2600K words and the dictionary includes 427K unique words; although it should be understood that the dictionary can also be based on any other language training corpus.

In embodiments, an annotated database used to train and test the misspelling correction system 100 includes any standard text corpus, e.g., standard Arabic text corpus, known as TRN_DB_I, with a size of about 100K words, an extra Arabic text corpus, known as TRN_DB_II, with a size of about 2500K words, which is extracted from classical Arabic literature, and test data, known as TST_DB, which includes 65K words, with about 20K errors which cover all of the types of errors described herein. Although TRN_DB$_{13}$ I has a size of about 100K words, TRN_DB_II has a size of about 2500K words, and TST_DB has 65K words with about 20K errors, it should be understood by those of ordinary skill in the art that training corpora and test data of different sizes are also contemplated by the present invention.

In embodiments, the standard Arabic text corpus TRN_DB_I is collected from numerous sources over diverse domains, and is manually revised and validated for spelling three times. The extra Arabic text corpus TRN_DB_II is extracted from classical Arabic literature and is revised for spelling once. In embodiment, the test data TST_DB is manually revised for spelling to annotate all misspelled words, and the test data TST_DB includes about 20K misspelled words which cover all types of spelling errors, as described herein. The test data TST_DB includes essays written by students from two universities that are handwritten, and manually converted to an electronic copy by data entry persons. Accordingly, the test data TST_DB has two sources of errors, e.g., the actual misspelled words by the students and the mistakes generated during the data entry process. That is, the text of TST_DB is collected from domains other than those used to obtain the text of TRN_DB_I and TRN_DB_II.

In embodiments, performance of the misspelling correction system 100 is measured based on natural language processing (NLP) measures, e.g., recall R, precision P, and score $F_1$, e.g., the accuracy, for both misspelling detection and correction. More specifically, the performance of the misspelling correction system 100 is based on Equations 1 to 3.

$$R = \frac{TP}{TP + FN} \quad \text{Equation (1)}$$

$$P = \frac{TP}{TP + FP} \quad \text{Equation (2)}$$

$$F_1 = 2 \cdot \frac{R \cdot P}{R + P} \quad \text{Equation (3)}$$

TP is a true positive, e.g., a spelling error is successfully detected and corrected, FN is a false negative, e.g., a spelling error is unsuccessfully detected and/or corrected, and FP is a false positive, e.g., a correctly spelled word is considered as a misspelled word or a misspelled word is corrected with a wrong alternative.

In embodiments, the system performance is measured by gradually increasing the training corpus size and calculating the recall R, precision P, and score $F_1$ based on TRN_DB_I. For example, Table 1 shows an illustrative, non-limiting example of detection and correction accuracies of the misspelling correction system 100 versus the training corpus size.

TABLE 1

| Training corpus | Error Detection | | | Error correction | | |
|---|---|---|---|---|---|---|
| size | R (%) | P (%) | $F_1$ (%) | R (%) | P (%) | $F_1$ (%) |
| 0.16 * Size Of (TRN_DB_I) = 16K words | 65.4 | 62.2 | 63.8 | 53.5 | 51.8 | 52.6 |
| 0.32 * Size Of (TRN_DB_I) = 32K words | 67.3 | 65.7 | 66.5 | 58.1 | 55.2 | 56.6 |
| 0.64 * Size Of (TRN_DB_I) = 64K words | 70.4 | 69.9 | 70.1 | 62 | 60.1 | 61 |
| Size Of (TRN_DB_I) = 100K words | 72.4 | 73.6 | 73 | 65.4 | 69.8 | 67.5 |

As shown in Table 1, the error detection process outperforms the error correction process. However, as the size of the training set increases, the difference between the performance of the error detection process and error correction process decreases. Accordingly, utilizing larger training sets increases the performance of the misspelling correction system 100.

For example, in alternate embodiments, the performance of the misspelling correction system 100 is measured by gradually increasing the training corpus size and calculating the recall R, precision P, and score $F_1$ based on TRN_DB_I and TRN_DB_II. In this way, the misspelling correction system 100 can rely on a database of about 2600K words. For example, Table 2 shows that the recall and precision rates for both error detection and correction processes achieve a saturation level at training corpora exceeding 2600K words. As shown in Table 2, the detection and correction accuracies of the misspelling correction system 100 increases with the use of large training data. As shown in Table 2, the precision rate of the error detection and error correction processes are similar when using a large training database.

TABLE 2

| Training corpus size | Error Detection | | | Error correction | | |
|---|---|---|---|---|---|---|
| | R (%) | P (%) | $F_1$ (%) | R (%) | P (%) | $F_1$ (%) |
| Size Of (TRN_DB_I) + 0.25 * Size Of (TRN_DB_II) = 725K words | 83 | 84.2 | 83.6 | 74.5 | 79.4 | 76.9 |
| Size Of (TRN_DB_I) + ½ Size Of (TRN_DB_II) = 1350K words | 92 | 93.2 | 92.6 | 84 | 89.8 | 86.8 |

In embodiments, experimental data shows that the accuracy of the misspelling correction system 100 decreases by avoiding the detection and the correction of the spaces deletions errors and the spaces insertions errors. For example, Table 3 shows the misspelling correction system accuracy without taking into consideration the spaces insertions and deletions errors. More specifically, by avoiding the space deletion and space insertion errors, the error detection accuracy of the misspelling correction system is reduced from 97.9% to 92.6% and the error correction of the misspelling correction system is reduced from 92.3% to 76.1%.

TABLE 3

| Training corpus size | Error Detection | | | Error correction | | |
|---|---|---|---|---|---|---|
| | R (%) | P (%) | $F_1$ (%) | R (%) | P (%) | $F_1$ (%) |
| Size Of (TRN_DB_I) + Size Of (TRN_DB_II) = 2600K words | 87.2 | 98.7 | 92.6 | 80.1 | 72.45 | 76.1 |

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Figure 2:
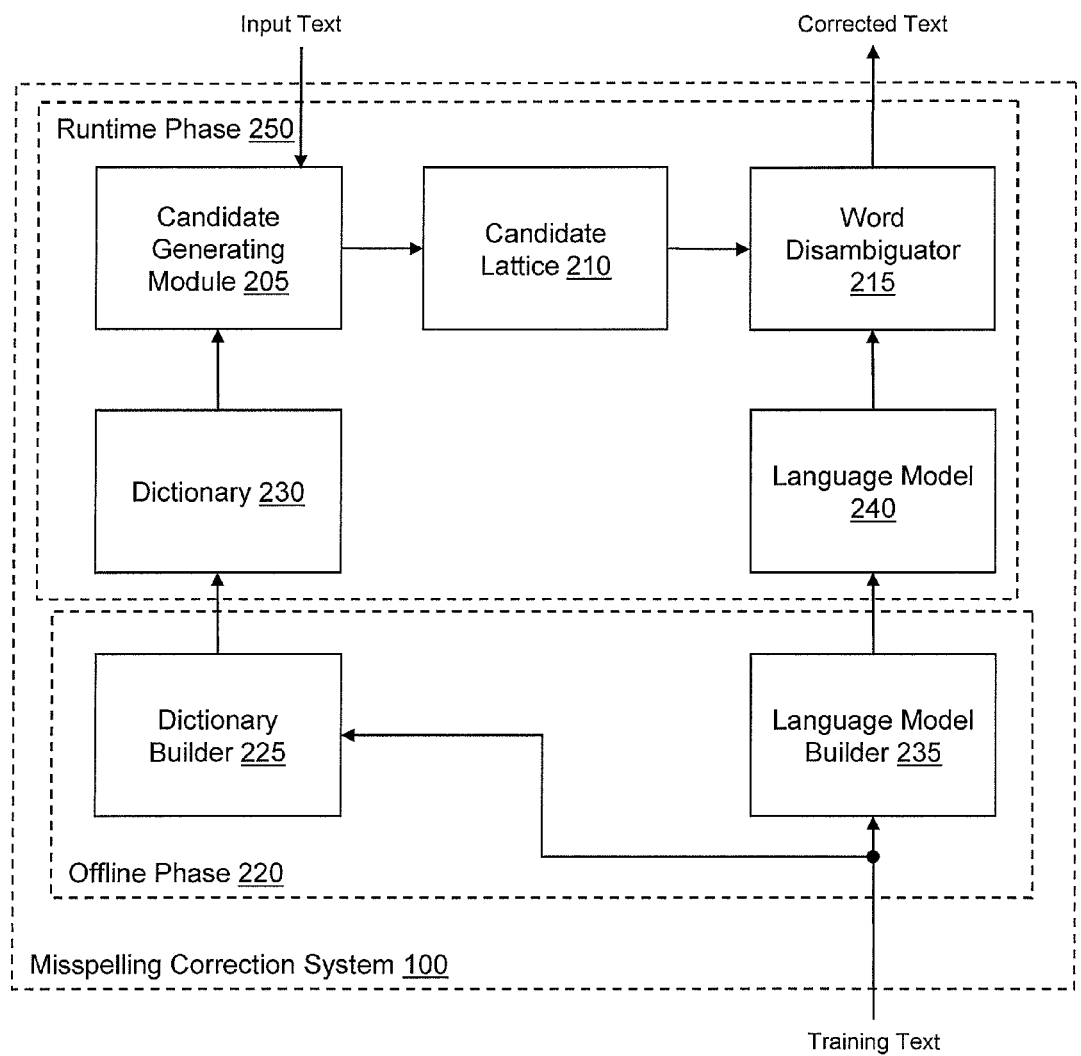
FIG. 2 shows an architecture of a misspelling correction system in accordance with aspects of the present invention.

FIG. 2 shows an architecture of the misspelling correction system 100. More specifically, the misspelling correction system 100 includes an offline phase 220 and a runtime phase 250. In the offline phase 220, training text, e.g., a training corpus, is provided to a dictionary builder 225 to build a dictionary 230 and to a language model builder 235 to build a language model 240. The dictionary 230 and language model 240 are used in the runtime phase 250. In embodiments, the language model builder 235 is a 3-grams language model builder and the language model is a 3-grams language model. In the runtime phase 250, an input text and the dictionary 230 are provided to a candidate generating module 205, which uses the dictionary 230 to detect the misspellings in the input text and generate possible candidates to correct the errors. The generated candidates constitute a candidate lattice 210 which is disambiguated by a word disambiguator 215. In embodiments, the word disambiguator 215 uses the language model 240 and implements tri-grams probability estimation and the A* lattice search to determine the most likely sequence of words to correct the misspelled words.

Figure 3:
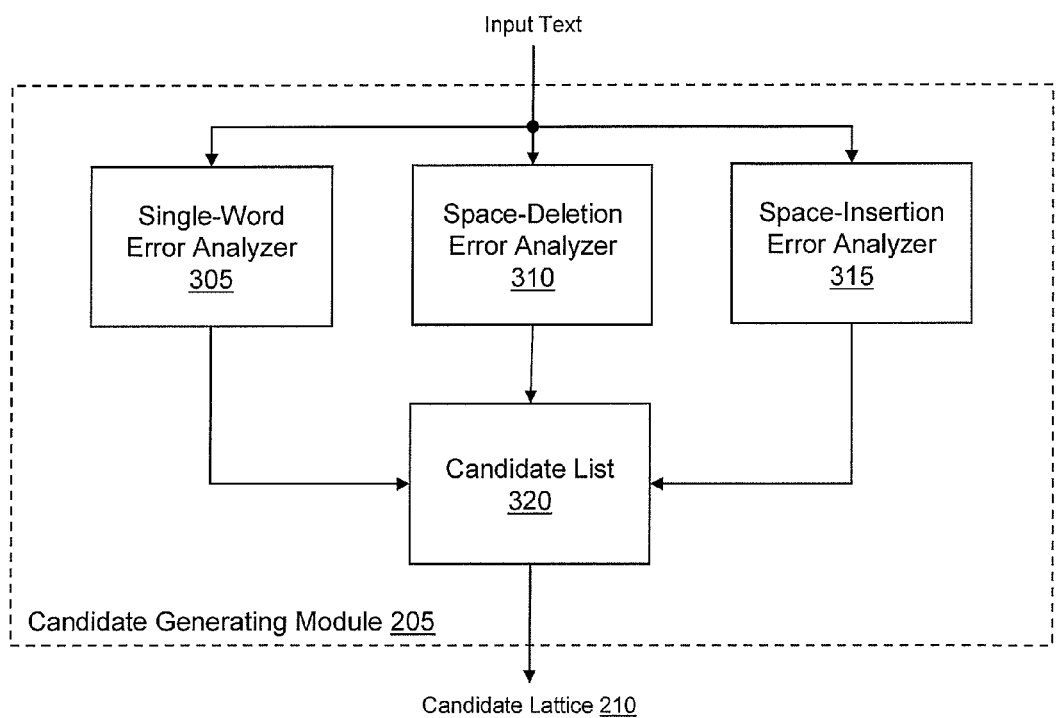
FIG. 3 shows a candidate generating module in accordance with aspects of the present invention.

FIG. 3 shows a block diagram of the candidate generating module 205. More specifically, in embodiments, the candidate generating module 205 includes a single-word error analyzer 305, space-deletion error analyzer 310, and space-insertion error analyzer 315. In embodiments, the single-word error analyzer 305 utilizes Damerau-Levenshtein distance to determine a cost of correcting detected errors. The Damerau-Levenshtein distance is a "distance" between two strings, i.e., finite sequence of symbols, given by counting a minimum number of operations needed to transform one string into the other, where an operation is defined as an insertion, deletion, or substitution of a single character, or a transposition of two adjacent characters.

The Damerau-Levenshtein distance is used to find the number of required edits, e.g., insertions, deletions, substitutions, and transpositions, to convert one word to another while considering all letters have the same distance cost, e.g., substituting "C" with "A" in the word "Car" to make the word "Aar" has the same cost distance as substituting "C" with "X" to make the word "Xar". That is, the conventional normal Damerau-Levenshtein distance is the same for converting the word "Car" either to "Aar" or "Xar," even though the letters "X" and "C" are adjacent on the keyboard, which is a likely cause for the misspelling.

In embodiments of the present invention, the Damerau-Levenshtein distance is modified to produce the variable cost Damerau-Levenshtein distance. For example, to increase a Damerau-Levenshtein distance efficiency, letters having similar shapes, e.g. ﺙ ـ ﺕ, similar pronunciation, e.g., ﺃ ـ ﻉ, or keyboard proximity, e.g., ﻝ ـ ا are given a low variable cost distance. Accordingly, the distance between to correct the misspelling "Xar" to "Car" is lower than the distance to correct the misspelling "Aar" to "Car," which sharpens the output from the Damerau-Levenshtein distance. Table 4 shows example Arabic letters having similar shapes, similar pronunciation, and keyboard proximity.

TABLE 4

| Letter | Pronunciation similarity | Shape similarity | Keyboard adjacency |
|---|---|---|---|
| س | ث - ص | ش | ي |
| ت | ط | ن - ب - ث | ا |
| ذ | ظ - ز | د | و |

As another example, the correctly spelled word مسطرة—Mastarah which means "Ruler" is mistakenly written as مصطرة—Mastarah because of the pronunciation similarity between the Arabic letters س and ص. Under the normal Damerau-Levenshtein distance, the edit distance from مصطرة—Mastarah to مسطرة—Mastarah ("Ruler") and the edit distance from مصطرة—Mastarah to معطرة—Mo'atarah ("Scented") is the same. To the contrary, in embodiments of the present invention, the variable cost distance is a lower for the word "مسطرة—Mastarah ("Ruler") than it is for the word "معطرة—Mo'atarah ("Scented"). Although the word معطرة—Mo'atarah ("Scented") is a right candidate to replace the misspelled word "مصطرة—Mastarah", there is no reasonable cause for mistakenly writing the letter ص instead of ع because they are far from each other on the keyboard, they have completely different shapes, and completely different pronunciations. Thus, it is not understood to mistakenly write the word "معطرة—Mo'atarah ("Scented") as مصطرة—Mastarah, and as such, they are not given a low variable cost Damerau-Levenshtein distance. It should be understood that the above examples as well as all examples provided herein are for illustrative purposes only, and should not be considered as limiting features of the present invention.

In embodiments, a variable cost Damerau-Levenshtein distance is applied to the four types of errors, i.e., insertions, deletions, substitutions, and transpositions. According to aspects of the invention, the variable cost Damerau-Levenshtein distance can be determined based on a pseudo code which functions to calculate the distance to convert one word to another while considering the letters that have the same distance cost, e.g., the distance between "far" and "car" is 1. For example, in embodiments, the variable cost Damerau-Levenshtein distance can be determined based on the following pseudo code (although other code is also contemplated by the present invention):

```
Algorithm 1 Damerau-Levenshtein distance with variable cost distance

Given: 2 strings A with length m and B with length n
Create: table T with (m+1) rows and (n+1) columns
for i from 0 to m
    T [i,0] := i
end for
for j from 1 to n
    T [0,j] := j
end for
for i from 1 to m
    for j from 1 to n
        if A[i] = B[j] then cost := 0
        else if A[i] and B[j] are similar according to the similarity table then
            cost := 1
        else           cost:=2
        T[i, j] := minimum( T[i , j-1] + cost +1, // insertion
                            T[i-1, j ] + cost +1, // deletion
                            T[i-1, j-1] + cost    // substitution)
        if(i > 1 and j > 1 and A[i] = B[j-1] and A[i-1] = B[j]) then
            T[i, j] := minimum( T[i, j],
                                T[i-2, j-2] + cost   // transposition)
    end for
end for
Return T[m,n]
```

In embodiments, after the error detection process determines all of the misspelled words, each word is compared with all words in the dictionary using the variable cost Damerau-Levenshtein distance. Accordingly, words with a minimum distance are considered as candidates for the misspelled words. As a result, utilizing the variable cost Damerau-Levenshtein distance improves performance of the misspelling correction system 100.

In embodiments, a clustering technique is implemented on the words in the dictionary to reduce the number of comparisons. More specifically, the clustering technique uses Equation 4.

$$d_l(a,b)=X \text{ and } d_l(a,c)=Y \Rightarrow |X-Y| \leq d_l(b,c) \leq X+Y \qquad \text{Equation (4)}$$

In this case, $d_l$ is the variable cost Damerau-Levenshtein distance and "a," "b," and "c" are three different words. According to Equation (4), a new version of the dictionary is created offline, where the words in the dictionary are combined into different clusters. Each cluster has a centroid $G_i$ and members $$M_{G_i} = \{m_{G_{i_1}} \ldots m_{G_{i_n}}\}$$

of size n, where $$d_l(G_i, m_{G_{i_j}}) = 1;$$

$1 \leq j \leq n$. For example, Table 5 shows a group $G_i$ and its members $\underline{M}_{G_i}$.

TABLE 5

| $G_i$ | $M_{G_i}$ | | | |
|---|---|---|---|---|
| | $m_{G_{i_1}}$ | $m_{G_{i_2}}$ | $m_{G_{i_3}}$ | $m_{G_{i_4}}$ |
| اخبارها | اخبارهم | إخبارها | أخبارهما | أوبارها |
| $d_l(G_i, m_{G_{i_j}})$ | 1 | 1 | 1 | 1 |

According to aspects of the invention, the word clustering can be determined based a pseudo code which functions to cluster a large number of words into a number of groups of words, where in each group, the words have a minimum distance to each other. For example, the word clustering can be determined based on the following pseudo code (although other code is also contemplated by the present invention):

```
Pseudo Code 2 Words clustering

Given: a dictionary D of size N
Create: table of clusters C
i:=0
while (D is not empty)
    G_i := D[0]
    t := size of (D)
    for j from 1 to t
        if d_l(G_i , D[j]) = 1 then D[j] → M_{Gi}
    end for
    remove G_i and all M_{Gi} members from D
    (G_i, M_{Gi}) → C
    i:=i+1
end while
Return C
```

If there is a misspelled word S and a two centroids $G_i$ with $d_l(G_i,S)=x$ and $G_k$ with $d_l(G_k,S)=x+1$, then according to Equation 4, $$|x-1| \le d_l(S, m_{G_{i_j}}) \le x+1;$$
$$1 \le j \le n_i$$

and $$x \le d_l(S, m_{G_{k_j}}) \le x+2;$$
$$1 \le j \le n_k$$

where $n_i$ and $n_k$ are the number of words in the groups $G_i$ and $G_k$ respectively. This means that $\underline{M}_{G_k}$ could also has some members whose edit distance x with S. Thus, both of $\underline{M}_{G_i}$ and $\underline{M}_{G_k}$ should be considered. In embodiments, a candidates' retrieval criteria can be based on pseudo code which functions to retrieve most probable candidates for correcting a misspelled word using the clusters discussed above. For example, a candidates' retrieval criteria can be determined based on the following pseudo code (although other code is also contemplated by the present invention):

---
Pseudo Code 3 Candidate Retrieval Criteria
---
Given: a misspelled word S and a clusters table C
Create: tables temp and candidates
t:= size of (C)
minimum:= length (S) // initialization
for i from 1 to t
   if ( $d_l$(C.$G_i$ , S) = minimum or $d_l$(C.$G_i$ , S) = minimum+1) then
      (C.$G_i$ , C.$\underline{M}_{Gi}$ ) → temp
   else if $d_l$(C.$G_i$ , S) < minimum then
      empty temp
      (C.$G_i$ , C.$\underline{M}_{Gi}$ ) → temp
      minimum:= $d_l$(C.$G_i$ , S)
end for
h:= size of (temp)
for i from 1 to h
   if $d_l$(temp[i] , S) = minimum then temp[i] → candidates
end for
return candidates

---

To show the effectiveness of this procedure, assume that the number of words in the dictionary is w, the number of created groups is g, the average number of words per each group is w/g, and the number of groups that have edit distances D and D+1 is z with an input misspelled word. In embodiments, a proposed comparison size is determined using Equation 5, and a reduction of the dictionary size is calculated using Equation 6. proposed comparisons $$\text{size} = g + z \cdot \frac{w}{g}; \quad \text{Equation (5)}$$

$$\text{reduction} = \frac{w - \left(g + z \cdot \frac{w}{g}\right)}{w}. \quad \text{Equation (6)}$$

In embodiments, g is about 0.25*w and z is about 0.01*g. Accordingly, by substituting these values into Equation (4), the reduction of the dictionary size is about 74%. In this way, the clustering technique provides for increased performance due to the smaller dictionary size.

In embodiments, the space-deletion error analyzer 310 detects that spaces are omitted between words. These types of errors are difficult to detect because the number of merged words is unknown, i.e., the number of omitted spaces is not known. In embodiments, when the merged words are $2^{nd}$ order errors, a conventional solution is to apply an exhaustive search by adding spaces everywhere in the merged word and split the merged word into N correctly spelled words. However, the order of complexity of this solution is $2^{l-1}$, where l is the number of letters in the merged words. For example, a merged word with 16 letters has 32,768 potential solutions.

In embodiments of the present invention, the merged words are split statistically by choosing the sequence of letters with the maximum marginal probability via the A* lattice search and an m-grams probability estimation using 15-grams language model of letters based on the corpus discussed above. For example, in embodiments, the 15-grams language model of letters is a tri-gram of words because the average number of letters in an Arabic word varies from 5 to 7 letters.

For example, if the phrase "My car is so fast" is mistakenly written as "Mycarissofast," i.e., spaces are omitted in between the words, in embodiments, the present invention determines the most probable location candidates to insert spaces. That is, in embodiments, the present invention considers the location between each two letters as a probable candidate for inserting space, and the A* search determines whether this location is a valid candidate. More specifically, at each step, the A* search queries the m-grams of letters to determine if a space insertion is appropriate, e.g., A* search asks what is the probability to have a space in this location given that the previous letters are "My," the next letter is a "c," and there are ten letters remaining after the "c". According to the calculated probability, the A* search decides whether to add a space in this location or not. At the final step, the A* guarantees to have the highest probability for the selected sequence of letters and spaces.

Figure 4:
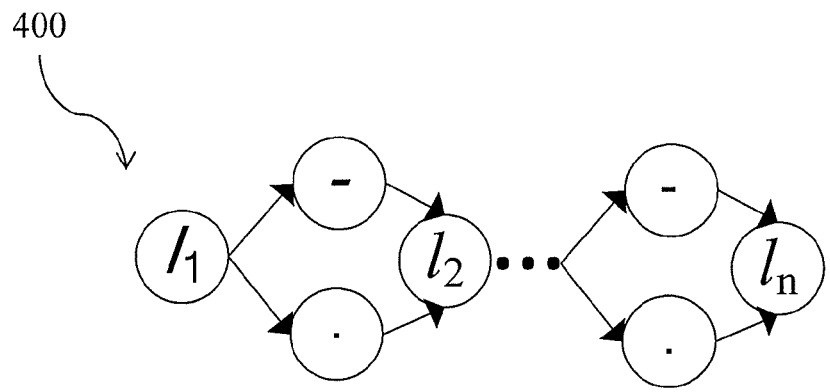
FIG. 4 shows a disambiguation trellis in accordance with aspects of the present invention.

In embodiments, in addition to the letters of an alphabet, e.g., the Arabic alphabet, two special letters are added "-" and ".", where the "-" and "." indicate space and no space, respectively. For example, the phrase منذ فجر التاريخ —Montho Fajre Altarekh, which means "Since the dawn of history," is represented in the training corpus as " ف.ج.ر.-.ا.ل.ت.ا.ر.ي.خ -.م.ن.ذ ". In this way, the misspelling correction system 100 disambiguates multiple possibilities of space locations. More specifically, statistical disambiguation is implemented to determine the sequence of letters and spaces from the letters and spaces of a disambiguation trellis, as shown in FIG. 4, with a maximum likelihood according to a statistical language model.

In embodiments, the space-insertion error analyzer 315 detects errors caused by adding one or more spaces inside a single word, which splits the word into two or more words. That is, each phrase in the input text includes split words that need to be merged together into a single word. Thus, each phrase of size n words has $2^{(n-1)}$ merging possibilities. In embodiments, pseudo code is used to find possible merging suggestions for this phrase based on the type of error, e.g., $2^{nd}$, $4^{th}$, $5^{th}$, and $6^{th}$ order errors, detected.

In embodiments, candidates retrieval for space insertions errors can be based on pseudo code which functions to find all possible merging solutions for an input phrase, e.g., with an input phrase having three words, possible merging solutions include: (i) merging the first word with the second word and letting the third word stand alone, (ii) merging the second word with the third word and letting the first word stand alone, or (iii) merging all three words together. For example, candidates retrieval for space insertions errors can be determined based on the following pseudo code (although other code is also contemplated by the present invention):

Pseudo Code 4 - Candidates Retrieval for Space Insertions Errors

```
Given: an array P of size n; where n is the number of words in an input
phrase, P[i] is the word number (i) in this phrase; 1 ≤ i ≤ n.
Create: table candidates, register b, and string temp.
Define: the function "binary representation (i)" that returns the binary
form for the input integer I, and the function "concatenate (m , n)" that
merges the two words (m , n) together.
t:= 2^(n-1) // the number of merging possibilities
for i from 1 to (t-1)
    b:= binary representation (i) // this converts the integer (i) into the
    binary form
    temp:= P[0]
    for j from 1 to n-1
        if ( b[j-1]=0) then temp:= concatenate (temp, space ) // 0
    means put space
        temp:= concatenate (temp, P[j] )
    end for
    temp→ candidates
    empty (temp)
end for
return candidates
```

In embodiments, the space-insertion error analyzer 315 generates all possible combinations of the input phrase. Each combination includes valid words and non-words. In embodiments, the processes of the present invention for candidate retrieval are applied to each non-word to find its possible candidates for correction.

FIG. 4 shows an example word trellis in accordance with aspects of the present invention. More specifically, FIG. 4 shows a disambiguation trellis 400 for a word with n number of letters $l_1$ to $l_n$, with a "-" indicating a space and a "." indicating no space. In embodiments, the disambiguation trellis 400 is used by the space-deletion error analyzer 310 of FIG. 3 to disambiguate multiple possibilities of space location. In this way, statistical disambiguation is utilized to determine a sequence of letters and spaces from the letters and spaces disambiguation trellis 400 with a maximum probability according to a statistical language model. More specifically, a best selected path by the A* search is a sequence of letters and spaces (i.e., sequence of words), each space indicating an end of its preceding word. In embodiments, these words include valid words in the dictionary and non-words. For each non-word in the output sequence, the pseudo code for candidate retrieval is used to find the possible candidates for the non-word(s). Accordingly, an output of the space deletion error analyzer includes a sequence of valid words and non-words, in addition to possible candidates for the non-words, as shown in FIG. 5.

Figure 5:
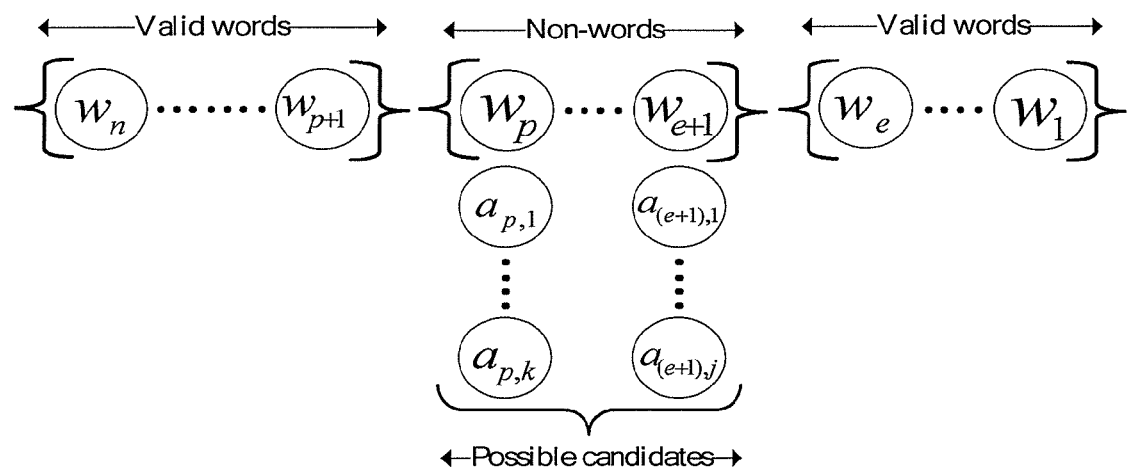
FIG. 5 shows an output of a space-deletion error analyzer in accordance with aspects of the present invention.

FIG. 5 shows an example output from the space-deletion error analyzer 310 of FIG. 3. More specifically, FIG. 5 shows proposed best candidates, e.g., separated words, $W_1$ to $W_n$ after applying the A* search. In embodiments, separated words $W_1$ to $W_e$ and $W_{p+1}$ to $W_n$ are valid dictionary words. To the contrary, in embodiments, separated words $W_{e+1}$ to $W_p$ are non-words. Accordingly, the non-words $W_{e+1}$ to $W_p$ are further analyzed to determine solutions. More specifically, the non-words $W_{e+1}$ to $W_p$ are analyzed using the processes and pseudo codes, as described herein. As a result, proposed candidates $a_{(e+1),1}$ to $a_{(e+1),j}$ and $a_{p,l}$ to $a_{p,k}$ are generated after applying the processes of the present invention for candidates' retrieval criteria. That is, FIG. 5 shows a sequence of valid words and non-words, in addition to possible candidates for the non-words.

Figure 6:
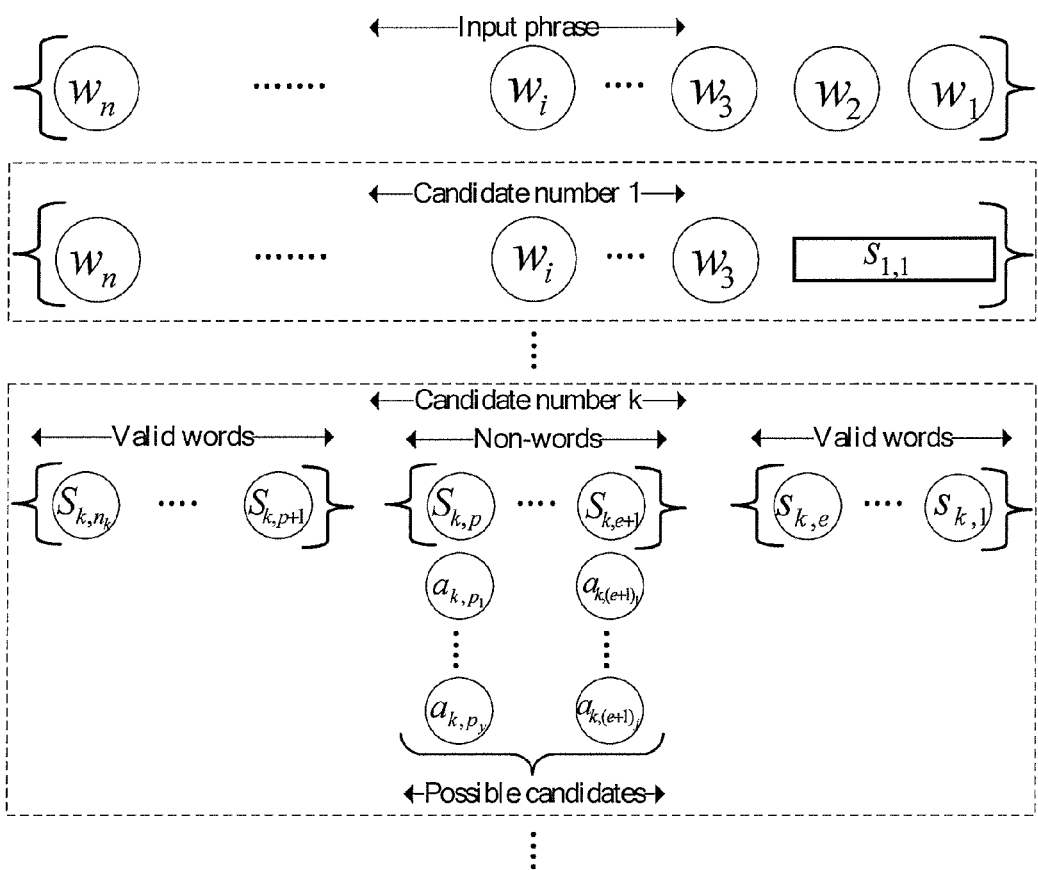
FIG. 6 shows an output of a space-insertion error analyzer in accordance with aspects of the present invention.

FIG. 6 shows an example of the output of the space-insertion error analyzer 315 of FIG. 3. More specifically, FIG. 6 shows n words, e.g., $W_1$ to $W_n$, in an input phrase, and each $S_{k,j}$ is a proposed merged word number j in the candidate solution number k that has a new number of words $n_k$ where $1 \le k \le 2^{(n-1)}$ and $1 \le j \le n_k$, and $n_k < n$. In embodiments, possible candidates $a_{k,(e+1)_l}$ to $a_{k,(e+1)_j}$ and $a_{k,p_l}$ to $a_{k,p_y}$ are the proposed candidates for the non-words in the candidate number k after applying the processes for candidates' retrieval criteria.

As shown in FIG. 6, a first candidate $S_{1,j}$ is a merged word of $W_1$ and $W_2$, and each word $S_{1,j}$ equals a word $W_{j+1}$ when $2 \le j \le n-1$. In a $k^{th}$ candidate, there are some valid words after merging and some non-words. Accordingly, for the processes for candidates' retrieval criteria is applied to the non-words to find possible corrections. In embodiments, the processes for candidates' retrieval criteria is used for all error types in correctly spelled words to find all words to detect and correct semantic hidden errors.

Figure 7:
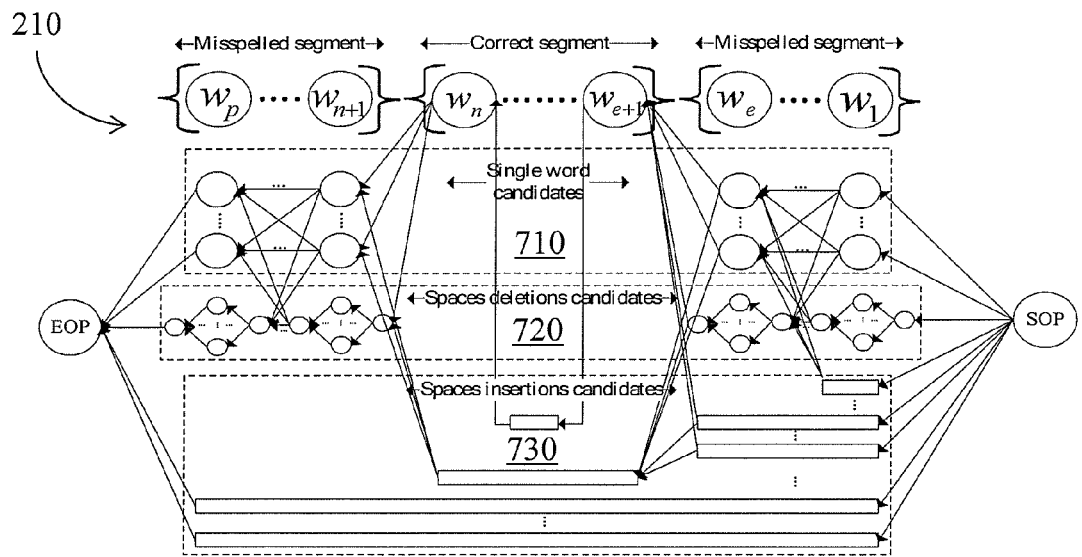
FIG. 7 shows a candidate lattice in accordance with aspects of the present invention.

FIG. 7 shows an example of candidates' lattice. More specifically, the candidates' lattice 210 includes a start of phrase indicator SOP and end of phrase indicator EOP. In embodiments, the candidates' lattice 210 includes one or more misspelled segments having non-words $W_1$ to $W_e$ and $W_{n+1}$ to $W_p$, in addition to a correct segment having correctly spelled words $W_{e+1}$ to $W_n$. In embodiments, the candidate's lattice includes one or more single word candidates 710, one or more space deletions candidates 720, and one or more space insertions candidates 730. In embodiments, the A*-based search is used to obtain a most likely sequence of analyses among the exponentially increasing possible sequences (paths) implied by the trellis topology based on a maximum a posteriori probability (MAP) formula. As should be understood by one of ordinary skill in the art, a MAP formula is a mode of the posterior distribution which can be used to obtain a point estimate of an unobserved quantity on the basis of empirical data.

In this way, the A* search follows a best-first path strategy while selecting a path-through the trellis topology to obtain a sequence realizing this maximization. The best-first path strategy is a statistical score G of a path until its terminal expansion node. In embodiments, a Zipfian sparseness of m-grams of natural language entities necessitates more elaboration, as should be understood by one of ordinary skill in the art. Accordingly, Good-Turing discount and back-off techniques, e.g., Katz's back-off model as is known in the art, are implemented to obtain reliable estimations of rarely or never occurring events, respectively. These techniques are used for both building the discrete distributions of linguistic entities from labeled corpora, and estimating the probabilities of any given m-grams of these entities in a runtime.

In embodiments, to realize a maximum search efficiency, i.e., minimum number of path expansions, a heuristic score function h* is added to the score G while selecting the next path to expand during the A* search. More specifically, in embodiments, to guarantee an admissibility of the A* search, i.e. guarantee the search terminates with the path with maximum score, the h* function stays above a minimum upper bound of the probability estimation of the remainder of the nodes sequence in the path being expanded.

Figure 8:
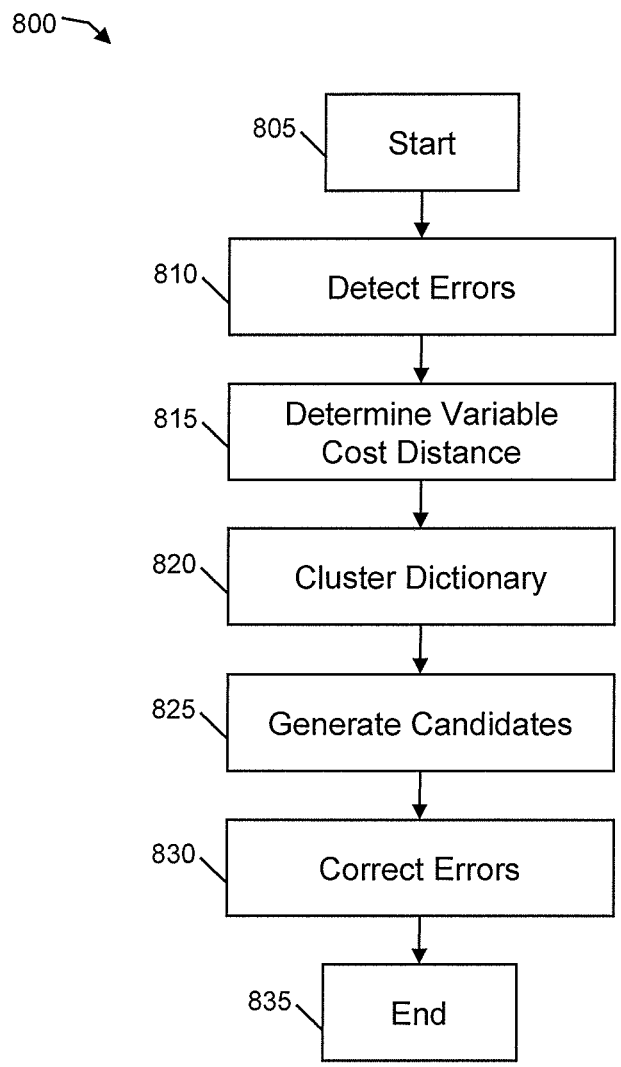
FIG. 8 shows an exemplary flow diagram implementing processes in accordance with aspects of the present invention.

FIG. 8 shows an exemplary flow diagram implementing a process 800 in accordance with aspects of the invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation. Furthermore, the invention can take the form of a computer program product accessible from a computer-usable or computer-readable medium providing program code for use by or in connection with a computer or any instruction execution system. The software and/or computer program product can be implemented in the environment of FIG. 1.

Furthermore, in embodiments, the present invention can take the form of a computer program product accessible from a computer-usable or computer-readable medium providing program code for use by or in connection with a computer or any instruction execution system. The software and/or computer program product can be implemented in the environments of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

As shown in FIG. 8, at step 805, the process of the invention begins. At step 810, the process includes detecting errors, e.g., insertions, deletions, substitutions, or transpositions. The process includes determining the variable cost Damerau-Levenshtein distance, at step 815. At step 820, a cluster dictionary is created using word clustering processes, as described herein. The process further includes generating potential candidates for correction using the candidate retrieval pseudo code at step 825 and correcting the errors at step 830. At step 835, the process ends.

The foregoing examples have been provided for the purpose of explanation and should not be construed as limiting the present invention. While the present invention has been described with reference to an exemplary embodiment. Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure, comprising:
    reviewing an input text to detect spelling errors in one or more words by detecting space-deletion errors and space-insertion errors;
    calculating a variable cost distance of letters associated with the one or more words;
    determining a best candidate solution for correcting the spelling errors based on the variable cost distance; and
    correcting the spelling errors using the best candidate solution, wherein:
        the detecting space-deletion errors comprises choosing a sequence of letters with a maximum marginal probability via an A* lattice search and m-grams probability estimation; and
        the detecting space-insertion errors comprises generating all possible combinations between words in an input phrase.

2. The method of claim 1, wherein the spelling errors include one or more insertions, deletions, substitutions, or transpositions.

3. The method of claim 2, wherein the spelling errors further include hidden semantic errors.

4. The method of claim 1, wherein the calculating the variable cost distance comprises utilizing a Damerau-Levenshtein distance to determine a cost of correcting the spelling errors.

5. The method of claim 4, wherein letters having similar shapes, similar pronunciation, or keyboard proximity are given a low variable cost distance.

6. The method of claim 4, wherein the determining the best candidate solution comprises comparing the spelling errors with all words in a dictionary using the variable cost distance and selecting one or more words having a minimum variable cost distance.

7. The method of claim 6, wherein the determining the best candidate solution further comprises choosing a sequence of words with a maximum marginal probability via an A* lattice search and m-grams probability estimation.

8. The method of claim 7, wherein the A* lattice search follows a best-first path strategy to select a path through a best candidate trellis, wherein the best-first path strategy is a statistical score of a path until its terminal expansion node.

9. The method of claim 8, wherein the determining the best candidate solution further comprises disambiguating the selected one or more words having a minimum variable cost distance.

10. The method of claim 9, further comprising adding a heuristic score function to the best-first path strategy to expand during the A* lattice search, wherein the heuristic score function stays above a minimum upper bound of a probability estimation.

11. The method of claim 6, further comprising clustering the words in the dictionary to reduce a number of comparisons.

12. The method of claim 1, further comprising:
    generating one or more solutions, which include valid words in a dictionary and misspelled words;
    analyzing the one or more solutions to correct the misspelled words in the one or more solutions; and
    determining a best candidate solution for the misspelled words in the one or more solutions.

13. A computer program product comprising a tangible computer readable storage medium having readable program code embodied in the tangible computer readable storage medium, the computer program product includes at least one component operable to:
    review an input text to detect spelling errors in one or more words;
    calculate a variable Damerau-Levenshtein cost distance of letters associated with the one or more words;
    determine a best candidate solution for correcting the spelling errors based on the variable Damerau-Levenshtein cost distance using an A* lattice search and an m-grams probability estimation; and
    correct the spelling errors using the best candidate solution.

14. The computer program product of claim 13, wherein letters having similar shapes, similar pronunciation, or keyboard proximity are given a low variable Damerau-Levenshtein cost distance.

15. The computer program product of claim 14, wherein the determining the best candidate solution comprises comparing the spelling errors with all words in a dictionary using the variable Damerau-Levenshtein cost distance and selecting one or more words having a minimum variable Damerau-Levenshtein cost distance.

16. The computer program product of claim 15, wherein the determining the best candidate solution further comprises:
   choosing a sequence of letters with a maximum marginal probability via the A* lattice search and the m-grams probability estimation, wherein:
      the A* lattice search follows a best-first path strategy to select a path through a best candidate trellis;
      the best-first path strategy is a statistical score of a path until its terminal expansion node; and
      a heuristic score function is added to the best-first path strategy to expand during the A* lattice search, wherein, the heuristic score function stays above a minimum upper bound of a probability estimation.

17. The computer program product of claim 16, wherein the determining the best candidate solution further comprises disambiguating the one or more words having a minimum variable cost distance.

18. A computer system for tokenizing multilingual textual documents, the system comprising:
   a CPU, a computer readable memory and a tangible computer readable storage media;
   first program instructions to review an input text to detect spelling errors in one or more words;
   second program instruction to calculate a variable cost distance of letters associated with the one or more words;
   third program instructions to determine a best candidate solution for correcting the spelling errors based on the variable cost distance using an A* lattice search and an m-grams probability estimation; and
   fourth program instructions to correct the spelling errors using the best candidate solution, wherein:
      the first, second, third, and fourth program instructions are stored on the tangible computer readable storage media for execution by the CPU via the computer readable memory;
      the calculating the variable cost distance comprises utilizing a Damerau-Levenshtein distance to determine a cost of correcting the spelling errors, wherein letters having similar shapes, similar pronunciation, or keyboard proximity are given a low variable cost distance; and
      the determining the best candidate solution comprises comparing the spelling errors with all words in a dictionary using the variable cost distance and selecting one or more words having a minimum variable cost distance.

19. The computer system of claim 18, wherein the determining the best candidate solution further comprises:
   disambiguating the one or more words having a minimum variable cost distance;
   clustering the words in the dictionary to reduce a number of comparisons; and
   choosing a sequence of letters with a maximum marginal probability via the A* lattice search and the m-grams probability estimation.

* * * * *